United States Patent Office 3,067,231
Patented Dec. 4, 1962

3,067,231
METHOD OF PRODUCING DIALKYL ALKANEPHOSPHONATES
Sidney H. Metzger, Jr., Anniston, Ala., assignor to Monsanto Chemical Company, St. Louis, Mo., a corporation of Delaware
No Drawing. Filed Aug. 1, 1952, Ser. No. 302,230
18 Claims. (Cl. 260—461)

The present invention relates to the production of simple and mixed dialkyl alkanephosphonates of relatively low molecular weight.

More specifically, the invention is directed to a novel method of producing dialkyl alkanephosphonates boiling substantially in the range of about 65° C. to about 150° C. and preferably in the range of about 67° C. to about 135° C. at a pressure of about 0.5 mm. to about 20 mm. of mercury. Stated in another way, the invention is concerned with a new method of producing dialkyl alkanephosphonates falling within the scope of the following general formula

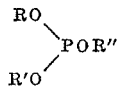

wherein R and R' are alkyl radicals which may individually contain from 1 to 10 carbon atoms, but together should contain at least 4 but not more than 11 and preferably not more than 9 carbon atoms, R'' is an alkyl radical and the sum of the carbon atoms in R, R' and R'' does not exceed 12 and preferably 10 carbon atoms.

The alkyl radicals in the above general formula may be branched or unbranched, i.e., methyl, ethyl, propyl, isopropyl, n-butyl, isobutyl, n-amyl, isoamyl, n-hexyl, 2-ethybutyl, n-heptyl, n-octyl, iso-octyl, 2-ethylhexyl, n-nonyl, iso-nonyl and n-decyl. Illustrative examples of dialkyl alkanephosphonates contemplated by this invention are diethylethanephosphonate, diethyl propanephosphonate, dipropyl methanephosphonate, diisopropyl methanephosphonate, diisopropyl ethanephosphonate, dipropyl propanephosphonate, diisopropyl propanephosphonate, dibutyl methanephosphonate and diisobutyl butanephosphonate.

Heretofore, the above dialkyl alkanephosphonates have been prepared by reacting sodium or potassium dialkyl phosphites with alkyl halides in the presence of an inert organic solvent which boils at a temperature substantially below that of the phosphonate. This reaction may be represented by the following equation:

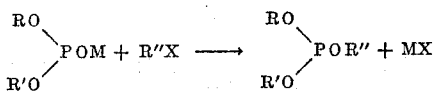

where R, R' and R'' have the same significance as indicated above, M is sodium or potassium and X is a halogen.

The above-described method has a number of serious disadvantages which render it commercially unattractive.

For example, if an attempt is made to separate the dialkyl alkanephosphonate directly from the crude reaction product, a secondary reaction occurs in which the ester group of the dialkyl alkanephosphonate is substituted by a salt ester group R''P(O)(ONa)(OR), with the elimination of R'X, (Nylen, Dissertation, Uppsala—1930). Moreover, this technique yields a residue containing by-product alkali metal halide from which it is difficult, if not impossible, to fully recover the dialkyl alkanephosphonate. These drawbacks have the ultimate practical effect of substantially reducing the yield of the above phosphonate.

As an alternative to the above procedure, the by-product alkali metal halide is separated from the crude reaction product by filtration or centrifuging. However, this method is subject to the disadvantage of being cumbersome and time-consuming since it is frequently necessary to allow the crude reaction product to stand for a considerable period of time so as to permit the colloidally dispersed alkali metal halide to coalesce to a crystalline form suitable for separation by centrifuging or filtering. Even when following this procedure, it is difficult to achieve a reasonably complete separation of the alkali metal halides due to the colloidal nature of these salts. Finally, a considerable amount of dialkyl alkanephosphonate is retained by the solid separated by the filter or centrifuge, which presents the difficult recovery problem referred to in the preceding paragraph.

A further alternative to the above recovery method is to remove the alkali metal halide from the dialkylalkanephosphonate by washing with water. However, this method is subject to the disadvantage of being unsuitable for use in the recovery of the lower esters since they are soluble and tend to be hydrolyzed by water.

It is an object of the instant invention to obviate the above disadvantages and provide a method whereby simple and mixed dialkyl alkanephosphonates can be produced in good yields and in an economically and commercially feasible manner.

Another object of the invention is to provide a method of producing simple and mixed dialkyl alkanephosphonates which permits the direct recovery of these products by distillation from the crude reaction mixture.

An additional object of the invention is to provide a method of producing simple and mixed dialkyl alkanephosphonates which produces substantially higher yields than the low boiling solvent method of the prior art.

A further object of the invention is to provide a method of producing the above products which permits simpler recovery and reuse of the solvent and at the same time minimizes decomposition of the desired dialkyl alkanephosphonate.

Other objects and advantages will become apparent as the description of the invention proceeds.

In accordance with the instant invention, a reactive metal dialkyl hydrogen phosphite and an alkylating agent are reacted together in the presence of an inert organic solvent which boils at a temperature substantially above that of the resulting dialkyl alkanephosphonate. The reaction is carried out at a temperature substantially in the range of about 50° C. to about 150° C., and preferably in the range of about 70° C. to about 100° C. The resulting crude reaction mixture is then subjected to distillation under reduced pressure, preferably under a reduced pressure of about 0.5 mm. to about 20 mm. of mercury, to directly separate the dialkyl alkanephosphonate. The residue consisting of the solvent-salt slurry is filtered, centrifuged or washed with water to remove the salt without the usual attendant loss of ester in such operations. The solvent thus separated may be then used, with or without drying as the situation requires, in the preparation of further quantities of dialkyl alkanephosphonate.

As illustrative examples of suitable alkylating agents there may be mentioned alkyl halides, alkyl alkanesulfonates, dialkyl sulfates, dialkyl sulfites, and alkyl esters of aryl sulfonates, etc. Typical representatives of these classes of alkylating agents are methyl-, ethyl-, propyl-, butyl-, amyl-, hexyl-, heptyl-, octyl- and nonyl chloride. etc. and the corresponding bromides and iodides; methyl methanesulfonate, etc., dimethyl-, diethyl-, dipropyl-, diamyl-, dihexyl-, diheptyl-, dioctyl- and dinonyl sulfates, etc. and the corresponding sulfites, etc.; and methyl-paratoluene sulfonate, etc.

As an alternative and less preferred method of practicing the instant invention, the reaction is initially carried out in the presence of a low boiling solvent such as toluene, xylene, hexane, ortho dichlorobenzene, etc. On completing this reaction, a high boiling solvent is added to the reaction mixture and the resulting product fractionally distilled to successively remove the low boiling solvent and the dialkyl alkanephosphonate.

As indicated above, the inert organic solvent employed is one which boils at atmospheric pressure at a temperature substantially above that of the dialkyl alpanephosphonate, that is, at a temperature at least about 40 degrees higher than the phosphonate at the above pressure. Illustrative examples of preferred solvents are alkylated naphthalenes, alkylated biphenyls, and partially hydrogenated aromatic hydrocarbon liquid mixtures, having a specific gravity within the range of 0.955 to 1.05 at 25° C. These partially hydrogenated aromatic hydrocarbon liquid mixtures are obtained by the partial catalytic hydrogenation of mixtures of normally solid aromatic hydrocarbons boiling above about 340° C. at 760 mm. pressure. For a more detailed description of their properties and method of preparation reference is made to Patent No. 2,364,719, which is incorporated by reference and made a part of the instant specification.

For a more complete understanding of the instant invention, reference is made to the following illustrative examples.

EXAMPLE I

*Preparation of Diisopropyl Methanephosphonate by High Boiling Solvent Method*

To a three-necked, two-liter flask equipped with a mechanical stirrer, a dropping funnel and a reflux condenser, which contained a dispersion of 49.8 grams of sodium in 820.6 grams of a hydrogenated terphenyl mixture having a specific gravity of about 1.004 at 25° C., there was slowly added 329 grams of diisopropyl hydrogen phosphite with the result that the latter was converted into sodium diisopropyl phosphite by reaction with sodium, the reaction taking place at a temperature of about 64° C. to about 118.5° C. The crude reaction mixture was stirred for 10 to 15 minutes to ensure substantially complete conversion and then there was introduced 200 grams of methyl chloride (100% excess) by way of a sparger that extended below the surface of the liquid. With external cooling, the reaction mixture was maintained between about 51° C. and about 87° C.; however, some heating was required to maintain a temperature of about 60° C. when adding the excess of methyl chloride. The crude reaction product containing diisopropyl methanephosphonate was stirred a few minutes and the phosphonate distilled under reduced pressure to a liquid temperature of 140° C. at 3 mm. Hg. The yield of diisopropyl methanephosphonate based on the diisopropyl hydrogen phosphite was 95% of theory.

EXAMPLE II

*Preparation of Diisopropyl Methanephosphonate Using a Low Boiling and a High Boiling Solvent*

Into a two-liter, three-necked flask equipped with a dropping funnel, mechanical stirrer, reflux condenser and thermometer, 500 milliliters of toluene and 36 grams of sodium were charged. To this mixture 249 grams of diisopropyl hydrogen phosphite was added, with stirring, over a period of 13 minutes, during which time the temperature was maintained at about 105° C. to about 110° C. After the reaction had gone to completion, 93 grams of methyl chloride was introduced through a sparger over a period of 27 minutes. During the addition of the methyl chloride, the reaction temperature was maintained at about 80° C. to about 84° C. The crude reaction product was distilled to remove a portion of the toluene, whereupon 200 grams of a hydrogenated terphenyl mixture similar to that employed in Example I was charged. The resulting mixture was then fractionally distilled so as to successively separate the toluene and di-isopropyl methanephosphonate. The yield of diisopropyl methanephosphonate was 85.5% of theory, basis diisopropyl hydrogen phosphite.

EXAMPLE III

*Preparation of Diisopropyl Methanephosphonate by Low Boiling Solvent Method*

332 grams of diisopropyl hydrogen phosphite was added to a dispersion of 51 grams of sodium in 500 ml. of toluene in the apparatus described in Example I. The ensuing reaction was carried out at about 109° C. and then the reaction mixture was refluxed at this temperature for one hour. To the crude reaction product there was added, via a sparger, 548 grams of methyl chloride with the temperature of the resulting reaction ranging from about 94° C. to about 115° C. The reaction mixture was stirred for 15 minutes and filtered through infusorial earth to remove the by-product sodium chloride which was washed with 350 ml. of toluene. The filtrate was then fractionated to yield diisopropyl methanephosphonate in a yield corresponding to 75.4% of theory, basis diisopropyl hydrogen phosphite.

EXAMPLE IV

*Preparation of Diisopropyl Butanephosphonate by High Boiling Solvent Method*

Into a one-liter three-necked flask equipped with stirrer, dropping funnel, thermometer and condenser was introduced 400 ml. of a hydrogenated terphenyl mixture having a specific gravity of about 1.004 at 25° C. To this was added 23 g. (1 mol) of sodium. The temperature of the resulting mixture was raised to 100° C., and the melting sodium stirred rapidly to form a suspension of fine particles. This suspension of sodium was maintained at 100° C. to 110° C. while 106 g. (1.1 mol) of diisopropyl phosphite was added over a period of about an hour. After the formation of the sodium salt, 102 g. of n-butyl chloride (1.1 mol) was added over a period of one hour. The reaction mixture thus obtained was maintained at a temperature of about 130° C. to about 140° C. for 5 hours and then permitted to cool. The crude reaction product was distilled under diminished pressure and diisopropyl butanephosphonate was recovered in a yield corresponding to 88% of theory.

EXAMPLE V

*Preparation of Diisopropyl Butanephosphonate by Low Boiling Solvent Method*

In a one-liter three-necked round bottomed flask equipped with stirrer, condenser, dropping funnel and thermometer was placed 400 cc. of dry xylene. To this was added 23 g. (1 mol) of sodium and the mixture heated to reflux the xylene. The sodium was dispersed by rapid stirring and then 166 g. (1 mol) of diisopropyl phosphite was added over a period of one-half hour. After the conversion to sodium diisopropyl phosphite had been completed, 107 g. of n-butyl chloride (1.15 moles) was added over a period of one-half hour. The reaction mixture was then refluxed for 10 hours with stirring and permitted to stand for 16 hours. A heavy deposit of salt was produced.

The xylene solution was decanted and washed with water. The salt residue was dissolved in a minimum of water and extracted with xylene. The xylene solutions were combined and passed through dry filter paper which removed some of the water. The filtered solution was then subjected to distillation under reduced pressure to separate the xylene and the remaining water. After removal of the above materials, the residue was distilled under reduced pressure and diisopropyl butanephosphonate was recovered in a yield corresponding to 79.7% of theory.

Examples I-V inclusive clearly show that the use of a high boiling solvent results in the production of dialkyl alkanephosphonates in yields which are substantially higher than those obtainable by the procedure previously employed.

EXAMPLE VI

*Preparation of Diisopropyl Methanephosphonate by Continuous High Boiling Solvent Method*

A mixture of sodium diisopropyl hydrogen phosphite and solvent prepared by the method described in Example I was continuously pumped into the top of a jacketed tower reactor which was cooled by passing cold water through the jacket. Methyl chloride was charged continuously, via a sparger, into the bottom of the above reactor, and reacted by direct countercurrent contact with the above phosphite, the excess methyl chloride passing out through the off-gas outlet at the top. The reaction mixture was continuously withdrawn from the bottom of the reactor and collected in a five-liter flask. The collected product was distilled at a liquid temperature of 140° C. at 3 mm. Hg and diisopropyl methanephosphonate was recovered in a yield corresponding to 95% of theory, based on the diisopropyl hydrogen phosphite.

Broadly stated, the present invention is applicable to the production of simple and mixed dialkyl alkanephosphonates by a method which involves carrying out the following reaction in the presence of a high boiling inert organic solvent:

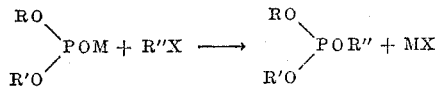

wherein R and R' are alkyl radicals which may individually contain from 1 to 10 carbon atoms, but together should contain at least 4 but not more than 11 and preferably not more than 9 carbon atoms, R" is an alkyl radical, M is selected from the group consisting of alkali metal and alkaline earth metals and X is a halogen, preferably chlorine, bromine and iodine. The simple and mixed dialkyl alkanephosphonates produced by the above method contain a total of not more than 12 and preferably not more than 10 carbon atoms.

Stated differently, the instant invention is applicable to the production of dialkyl alkanephosphonates which boil substantially in the range of about 65° C. to about 150° C. at a pressure of from about 0.5 to about 20 mm. of mercury. More specifically, the invention is applicable to the production of phosphonates of the above type which boil at a temperature of about 67° C. to about 135° C. at a pressure of about 10 to about 12 mm. of mercury.

The dialkyl phosphites which are preferably used in the practice of the above method are the sodium, potassium and calcium salts, but other alkali metal salts and alkaline earth salts such as barium and strontium dialkyl phosphites are also within the scope of the invention.

The reaction between the dialkyl phosphite salt and the alkyl halide is executed at a temperature substantially in the range of about 50° C. to about 150° C., but a temperature of about 70° C. to about 100° C. is preferred. Higher or lower temperatures are also within the scope of the invention, but when higher temperatures are used those temperatures avoiding substantial decomposition of the dialkyl alkanephosphonate should be selected.

The reaction between the dialkyl phosphite salt and the alkyl halide is carried out in the presence of an inert high boiling organic solvent which boils at atmospheric pressure at least about 40° C. above the boiling point of the dialkyl alkanephosphonate so as to facilitate the separation of these materials. Alternatively, the reaction is carried out in the presence of an inert low boiling solvent, after which a high boiling inert organic solvent is added and the product fractionally distilled to separate the dialkyl alkanephosphonate. Illustrative examples of inert high boiling organic solvents which may be used are mononyl naphthalene, polyamyl naphthalene, other alkylated naphthalenes, alkylated biphenyls, and partially hydrogenated terphenyls. These solvents have the following combination of properties:

| Compound | Specific gravity at 25° C. | Boiling range, ° C. | Solubility in water |
|---|---|---|---|
| Mononyl naphthalene | 0.93–0.94 | 320–350/760 mm. Hg. | Insoluble. |
| Mixture of amylnaphthalenes. | 0.92–0.94 | 290–400/760 mm. Hg. | Do. |
| Polyamyl naphthalene | 0.92–0.93 | 353–397/760 mm. Hg. | Do. |
| Propylated biphenyl | 0.94 | 163–218/20 mm. Hg. | Do. |
| Polyamyl biphenyl | 0.93–0.96 | 101–194/3–1.5 mm. Hg. | Do. |
| Ethylated biphenyl | 0.97 | 145–213/17–16 mm. Hg. | Do. |
| Monoamyl biphenyl | 0.97 | 314–338/760 mm. Hg. | Do. |
| Diamyl biphenyl | 0.96 | 364–404/760 mm. Hg. | Do. |
| Partially hydrogenated terphenyls. | 1.004±0.003 | 340–396/760 mm. Hg. | Do. |

It is, of course, to be understood that other equivalent high boiling inert solvents may be used.

The separation of the dialkyl alkanephosphonates from the crude reaction product is accomplished by distillation at a temperature of about 65° C. to about 150° C. and preferably at a temperature of about 67° C. to about 135° C. at pressures of from about .5 to about 20 mm. of mercury, and preferably at pressures of about 10 mm. to about 12 mm. of mercury.

The instant invention provides a method of producing dialkyl alkanephosphonates which yields a crude reaction mixture from which the dialkyl alkanephosphonates can be directly distilled in higher yields than that obtainable by the low-boiling solvent method; and it also provides a method which yields, on distillation of the dialkyl alkanephosphonate, a residue from which the solvent can be separated from the by-product metal salts more readily and more advantageously than the latter can be separated from the residue of the low boiling solvent method.

While the invention has been described with particular reference to specific embodiments, it is to be understood that it is not to be limited thereto but is to be construed broadly and restricted solely by the scope of the appended claims.

What I claim is:

1. The method of producing dialkyl alkanephosphonates, which comprises reacting, in the presence of an inert high boiling organic solvent, a compound selected from the group consisting of alkali metal and alkaline earth metal dialkyl phosphites containing at least 4 carbon atoms with an alkylating agent and then distilling under reduced pressure the resulting phosphonate from the crude reaction product, said reactants containing a total of not more than 12 carbon atoms, said solvent having a boiling point that is substantially higher than said phosphonate and said reaction being carried out at a temperature substantially in the range of about 50° C. up to a temperature avoiding substantial decomposition of said phosphonate.

2. The method of producing dialkyl alkanephosphonates, which comprises reacting, in the presence of an inert high boiling organic solvent, a compound selected from the group consisting of alkali metal and alkaline earth metal dialkyl phosphites containing at least 4 carbon atoms with an alkylating agent selected from the group consisting of alkyl esters of monocyclic aryl hydrocarbon sulfonic acids, dialkyl sulfates, alkanesulfonates, dialkyl sulfites, alkyl chlorides, alkyl bromides and alkyl iodides, and then distilling under reduced pressure the resulting phosphonate from the crude reaction product, said reactants containing a total of not more than 12 carbon atoms, said solvent having a boiling point that is substantially higher than said phosphonate and said reaction being carried out at a temperature substantially in the range of about 50° C. up to a temperature avoiding substantial decomposition of said phosphonate.

3. The method of producing dialkyl alkanephosphonates, which comprises reacting, in the presence of an inert high boiling organic solvent, a compound selected from the group consisting of alkali metal and alkaline earth metal dialkyl phosphites containing at least 4 carbon atoms with an alkyl halide and then distilling under reduced pressure the resulting phosphonate from the crude reaction product, said reactants containing a total of not more than 12 carbon atoms, said solvent having a boiling point that is substantially higher than said phosphonate and said reaction being carried out at a temperature substantially in the range of about 50° C. up to a temperature avoiding substantial decomposition of said phosphonate.

4. The method of producing dialkyl alkanephosphonates, which comprises reacting, in the presence of an inert high boiling organic solvent, a compound selected from the group consisting of alkali metal and alkaline earth metal dialkyl phosphites containing at least 4 carbon atoms with an alkyl chloride and then distilling under reduced pressure the resulting phosphonate from the crude reaction product, said reactants containing a total of not more than 10 carbon atoms, said solvent having a substantially higher boiling point than said phosphonate and said reaction being carried out at a temperature substantially in the range of about 50° C. to about 150° C.

5. The method of producing dialkyl alkanephosphonates in accordance with claim 6 in which a calcium dialkyl phosphite containing at least 4 carbon atoms is employed.

6. The method of producing dialkyl alkanephosphonates, which comprises reacting, in the presence of an inert high boiling organic solvent, a sodium dialkyl phosphite containing at least 4 carbon atoms with an alkyl chloride and then distilling under reduced pressure the resulting phosphonate from the crude reaction product, said reactants containing a total of not more than 10 carbon atoms, said solvent having a boiling point that is substantially higher than said phosphonate and said reaction being carried out at a temperature substantially in the range of about 50° C. to about 150° C.

7. The method of producing dialkyl alkanephosphonates, which comprises reacting, in the presence of an inert high boiling organic solvent, a potassium dialkyl phosphite containing at least 4 carbon atoms with an alkyl chloride and then distilling under reduced pressure the resulting phosphonate from the crude reaction product, said reactants containing a total of not more than 10 carbon atoms, said solvent having a boiling point that is substantially higher than said phosphonate and said reaction being carried out at a temperature substantially in the range of about 50° C. to about 150° C.

8. The method of producing dialkyl alkanephosphonate, which comprises reacting, at a temperature of from about 50° C. to about 150° C. and in the presence of an inert high boiling organic solvent, a compound selected from the group consisting of alkali metal and alkaline earth metal dialkyl phosphites containing at least 4 carbon atoms with an alkyl halide and then distilling under reduced pressure the resulting phosphonate from the crude reaction product, said reactants containing a total of not more than 10 carbon atoms and said solvent having a boiling point that is substantially higher than said phosphonate.

9. The method of producing dialkyl alkanephosphonates, which comprises reacting, at a temperature of from about 70° C. to about 100° C. and in the presence of an inert high boiling organic solvent, a compound selected from the group consisting of alkali metal and alkaline earth metal dialkyl phosphites containing at least 4 carbon atoms with an alkyl halide and then distilling under reduced pressure the resulting phosphonate from the crude reaction product, said reactants containing a total of not more than 10 carbon atoms and said solvent having a boiling point that is substantially higher than said phosphonate.

10. The method of producing dialkyl alkanephosphonates, which comprises reacting, in the presence of an inert high boiling organic solvent, a compound selected from the group consisting of alkali metal and alkaline earth metal dialkyl phosphites containing at least 4 carbon atoms with an alkyl chloride and then distilling under reduced pressure the resulting phosphonate from the crude reaction product, said reactants containing a total of not more than 10 carbon atoms, said solvent being a partially hydrogenated terphenyl mixture having a specific gravity of within the range of 0.950 and 1.05 at 25° C. and said reaction being carried out at a temperature substantially in the range of about 50° C. to about 150° C.

11. The method of producing dialkyl alkanephosphonates, which comprises reacting, in the presence of alkylated naphthalenes having a boiling point that is substantially higher than said phosphonates, a compound selected from the group consisting of alkali metal and alkaline earth metal dialkyl phosphites containing at least 4 carbon atoms with an alkyl chloride and then distilling under reduced pressure the resulting phosphonate from the crude reaction product, said reactants containing a total of not more than 10 carbon atoms and said reaction being carried out at a temperature substantially in the range of about 50° C. to about 150° C.

12. The method of producing diisopropyl methanephosphonate, which comprises reacting, in the presence of an inert high boiling organic solvent, sodium diisopropyl phosphite with methyl chloride and then distilling under reduced pressure the resulting diisopropyl methanephosphonate from the crude reaction product, said solvent having a boiling point that is substantially higher than said phosphonate and said reaction being carried out at a temperature substantially in the range of about 50° C. to about 150° C.

13. The method of producing diisopropyl methanephosphonate in accordance with claim 14 in which the high boiling organic solvent used is a partially hydrogenated terphenyl mixture having a specific gravity within the range of 0.950 to 1.05 at 25° C.

14. The method of producing diisopropyl methanephosphonate in accordance with claim 14 in which the high boiling organic solvent used is a partially hydrogenated terphenyl mixture having a specific gravity of 1.017 at 25° C.

15. The method of producing diisopropyl methanephosphonate, which comprises reacting, in the presence of an alkylated naphthalene having a boiling point that is substantially higher than said phosphonates, sodium diisopropyl phosphite with methyl chloride and then distilling under reduced pressure the resulting diisopropyl methanephosphonate from the crude reaction product, said reaction being carried out at a temperature substantially in the range of about 50° C. to about 150° C.

16. The method of producing diisopropyl butanephosphonate, which comprises reacting, in the presence of an inert high boiling organic solvent, sodium diisopropyl phosphite with butyl chloride and then distilling under reduced pressure the resulting diisopropyl butanephosphonate from the crude reaction product, said solvent being a partially hydrogenated terphenyl mixture having a specific gravity of 1.017 at 25° C. and said reaction being carried out at a temperature of about 100° C. to about 150° C.

17. The method of producing diisopropyl butanephosphonate, which comprises reacting, in the presence of an alkylated naphthalene having a boiling point that is substantially higher than said phosphonate, sodium diisopropyl phosphite with butyl chloride and then distilling under reduced pressure the resulting diisopropyl butanephosphonate from the crude reaction product, said reaction being carried out at a temperature of from about 130° C. to about 150° C.

18. The method of producing dialkyl alkanephosphonates, which comprises reacting, in the presence of an inert organic solvent, a compound selected from the group consisting of alkali metal and alkaline earth metal dialkyl phosphites containing at least 4 carbon atoms with an alkylating agent to form the corresponding dialkyl alkanephosphonate, adding, if not already present, a high boiling inert organic solvent and then distilling under reduced pressure said phosphonate from the crude reaction product, said reactants containing a total of not more than 12 carbon atoms, said first-mentioned solvent being selected from the group consisting of low and high boiling inert organic solvents and said high boiling inert organic solvent having a boiling point that is substantially higher than said phosphonates.

References Cited in the file of this patent

UNITED STATES PATENTS

| | | |
|---|---|---|
| 2,326,140 | Gzemski | Aug. 10, 1943 |
| 2,397,422 | Kosolapoff | Mar. 26, 1946 |
| 2,853,507 | Smith | Sept. 23, 1958 |
| 2,880,224 | Smith | Mar. 31, 1959 |

OTHER REFERENCES

Kosolapoff: Organo-Phosphorus Compounds, John Wiley Sons, N.Y., page 196.